May 25, 1965                V. R. DESPARD                3,185,760
                  PUSH-IN BOX MOUNTING FOR WIRING DEVICES
                          Filed July 6, 1962

INVENTOR
VICTOR R. DESPARD
BY
ATTORNEY

United States Patent Office 3,185,760
Patented May 25, 1965

3,185,760
PUSH-IN BOX MOUNTING FOR WIRING DEVICES
Victor R. Despard, Syracuse, N.Y., assignor to Pass & Seymour, Inc., Syracuse, N.Y., a corporation of New York
Filed July 6, 1962, Ser. No. 207,930
8 Claims. (Cl. 174—54)

This invention relates to means for mounting wiring devices, such as wall switches, convenience outlets, pilot lights and the like, in wall or conduit boxes sometimes referred to as switch boxes, and particularly to such means which mount the device automatically when it is merely pushed into the box.

It is a general object of the present invention to provide a novel and improved push-in box mounting for wiring devices.

More particularly, it is an object of the invention to provide, as a component part of a wiring device, sharpened spring tongues so arranged on the device as to strongly engage the flat opposed end walls of the box and resist withdrawal, lateral or rocking movements.

A most important feature of the invention consists in the attachment to each wiring device of a pair of oppositely disposed resilient metal fittings each having at least two laterally spaced prongs or barbs so spaced and directed as to be resiliently engaged with the opposite end walls of a switch box when the wiring device is merely pressed into the box, the barbs digging in the box ends to prevent withdrawal and the normal plaster ears on the mounting strap of the device limiting the amount of insertion of the device into the box.

A very important feature of the invention resides in the provision of removable stirrup-like fittings arranged for connection to the mounting strap of a wiring device, one near either end thereof and each fitted with multiple sharpened points of resilient metal for engaging against the inner faces of the end walls of a switch box and so directed as to facilitate insertion of the wiring device into the box, but which dig into the metal of the box ends to prevent withdrawal.

Another important feature of the invention consists in the provision of bracing means for the fittings, which are conveniently removable, whereby they are firmly held in position to engage the switch box end walls by cooperation with the portions of the wiring device or its mounting strap.

Still another important feature of the invention consists in the provision of non-barbed spring tongues arranged to engage each box end wall for automatic grounding purposes when used with convenience outlets of the third prong grounding type.

Other and further objects and essential features of the invention will be more apparent to those skilled in the art upon a consideration of the following specification and the accompanying drawings wherein are disclosed several exemplary embodiments of the invention, with the understanding that such changes and modifications may be made therein as fall within the scope of the appended claims without departing from the spirit of the invention.

With the rapidly mounting costs of electrical work, as exemplified by the recently shortened working day, plus at least one hour at overtime per day, as bargained by the electricians' union in New York City, the cost of small electrical appliances such as wiring devices like wall switches, convenience outlets and the like is greatly overshadowed by the cost of installing the same. It is therefore obvious that contractors can well pay more for a product which reduces the time required for installation and still save money, as against the higher cost of installing lower priced present type devices. The present invention therefore contemplates an appurtenance or addition to such common wiring devices as convenience outlets, wall switches and the like which permits them to be installed in a so-called "wall" or "switch" box by the simple operation of pressing them into position until the plaster ears or similar extensions on the usual mounting strap engage the outer surface of the wall to terminate the introduction of the device at the desired proper position to receive the customary wall plate. Admittedly, the addition of such means may increase the cost of the article by a few cents, but since the electricians' time, now valued at more than ten cents a minute, is materially reduced for the quicker installation operation over that of applying the usual mounting screws, the overall savings in the cost of the installed device is well worthwhile.

Wall boxes are, of course, installed by the electrician prior to the plastering or other wall surfacing operations and are often times partly filled with plaster, which, at least extends over the tabs which are turned at right angles from the end walls of the boxes and tapped to receive the mounting screws which pass through slots in the mounting straps on the wiring devices. Oftentimes the plaster must be chipped out to expose these tabs to permit inserting the mounting screws, and sometimes plaster must be dug out of the screw holes and the threads retapped all of which takes an inordinate amount of expensive time, whereas, in accordance with the present invention, as long as the box is not filled with plaster the wiring device can be instantly pushed into position until the plaster ears stop the strap against the surface of the wall and the mounting job is complete, the wiring, of course, having been done prior to inserting the outlet or other device in the box as has been customary.

Figure 1:
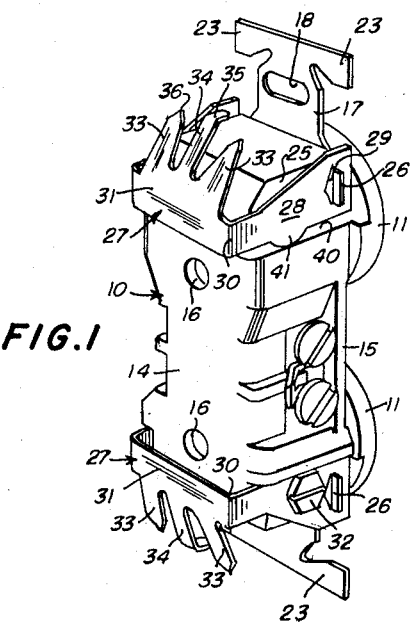
FIGURE 1 is a perspective view, looking from the rear of a duplex grounding convenience outlet fitted with the automatic box mounting features of the present invention.
Figure 2:
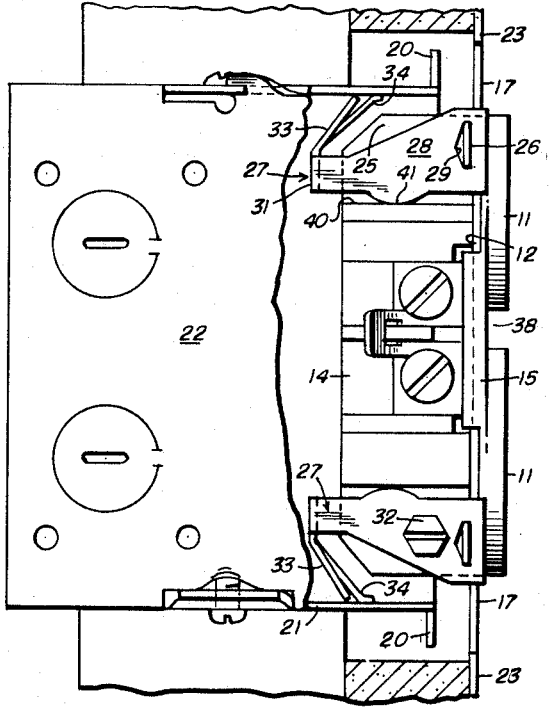
FIGURE 2 is a side elevation of a switch mounting box equipped with the outlet of FIGURE 1, the front portion of the near side wall of the box being broken away to illustrate the operation of the mounting means.

For a better understanding of the invention reference should now be had to the drawing, and first to FIGURES 1 and 2, showing an embodiment of the invention particularly adapted for use with convenience outlets of the duplex type the construction of which is so well understood that it need not be described here other than to say that the device is composed of a large block 10 of plastic insulating material, having two partly circular faces 11 each intended to be exposed through a wall plate and slotted to receive the blades of an attachment plug. Such devices are conventionally fitted with a mounting strap 12 of metal secured thereto either by being clamped between the base 14 and the cover 15 which is secured thereto as by screws 16, or in some constructions, by passing beneath and there being secured to the insulation block, and being bent up around the ends thereof. Either style then supports tabs 17 provided with slots 18 normally receiving the mounting screws which enter into threaded apertures in the integral tongues 20 turned out from the end walls 21 of the wall or switch box 22 of conventional construction. These tabs 17 are usually equpped with so-called plaster ears 23, which are removable by breaking in the event that they are not required, and which perform the function of limiting the entrance of the wiring device into the box so that the usual cover or wall plate (not shown) properly exposes the convenience outlet faces, a switch handle or the like therethrough.

Since the operation of passing screws through the slots 18 and into the threaded openings in the tongues 20 is the time consuming one, in the installation of wiring devices, the present invention proposes to eliminate the use of these screws entirely and to fasten the wiring device just as rigidly in position merely as a result of pressing it into place in the box until the plaster ears engage the wall surface. For this purpose the strap 12 is widened sufficiently on both sides beneath the undersurface of each of the face discs 11 to extend laterally out beyond the faces 25 of the insulation block 10 and is there provided with integral rectangular tongues 26 which, in the construction illustrated, are offset downwardly from the main plane of the strap which extends through the part 17, in order to provide for attaching the stirrup-like devices 27. These each have flat side members 28 engaging the opposite faces 25 and perforated at 29 to fit over the tongues 26 for attachment to the strap as illustrated.

These side plates taper down in width from the maximum, arranged to accommodate the perforations 29, rearwardly to the narrow sections shown where right angle bends 30 connect them with the integral cross piece 31 extending somewhat below the bottom of the insulation block 10. The inner facing edge of this piece 31 is straight but the outwardly facing one is formed into two tongues or barbs 33 of identical construction and well spaced apart laterally, as shown, to accommodate between them the grounding tang 34 having the upturned end 35. The tongues 33 are sharply pointed, as shown at 36, and so positioned, by bending upwardly out of the plane of the cross piece 31 at an angle of approximately 45 degrees, as best seen in FIGURE 2, so that they may engage the inner faces of the end walls 21 of the box when the wiring device is pressed into position and actually dig into the metal thereof so that any effort to move or remove the wiring device is resisted by these tongues cutting into the end walls and firmly holding the wiring device in position. The wide lateral spacing of the points 36 insures against rocking of the wiring device on the application or removal of an attachment plug, for instance, and this stability is greatly enhanced when the customary wall plate is attached to the wiring device by means of a screw passing between the discs 11 at 38 and entering the strap 12, in a position not visible in either of the figures, in the customary manner. The edges of this wall plate which is closely secured to the wiring device engage the surfaces of the wall and prevent any such canting.

The operation of inserting such a wiring device into a wall box is most conveniently achieved by setting the lower prongs 26 as far into the box as permitted by the adjacent plaster ears at that end and then pressing the other end in position using the thumbs. Both ends are finally pressed until both sets of plater ears engage the surface of the wall and terminate the inward movement.

The intermediate non-sharpened tongue 34 with its flattened tab end 35, because of its narrowness and length is less stiff than the barbs 33 and does not cut into the surface of the metal of the box, but is primarily provided to insure grounding, in the event that the outlet is of the grounded type. In such outlets a hexagon headed screw, painted green, is always provided for grounding and this enters directly into a down-turned tab on the mounting strap and is for use in the event that the box is not properly grounded, or to by-pass the usual poor connection provided by the screws as heretofore used to attach the mounting strap to the box tongues. These screws, not being required to be plated, may rust rapidly in certain atmospheres and fail to provide adequate grounding. The majority of the present day wall boxes are plated against rusting and the stirrups 27 are also so treated so that the tab 35 makes a metal-to-metal connection which is not nearly so subject to corrosion as the usual steel-to-steel in the box tab. In the present case the hexagon headed, green painted screw is threaded into one of the side members 28 as seen at 32.

It was previously pointed out how the device is inserted in the box and how the plaster ears limit its insertion to just the proper degree. Should the device be canted or skewed in respect to the box or the whole device offset too much to one side, it can readily be moved by prying with a screw driver, a common tool with wiremen or can even be removed and replaced by prying the one pair of the barbs 33 loose at one end and removing the device for proper replacement. This, however, never seems to be necessary since the device can be readily adjusted laterally for proper alignment in the box after being positioned therein.

Since the metal of the mounting strap and also of the stirrup 27 is not excessively heavy, reliance is not placed on the tabs 26 to take the torque of the tongues 33 pressing against the inner walls of the box, and they are so properly spaced that there could be considerable strain put on the tabs. However, they are relieved by use of the heavy projection or shoulder 40 molded near each end of the wiring device against which the shallow tongue 41 on the otherwise straight edge of each side member of the stirrup presses, as clearly indicated in FIGURES 1 and 2.

Figure 3:
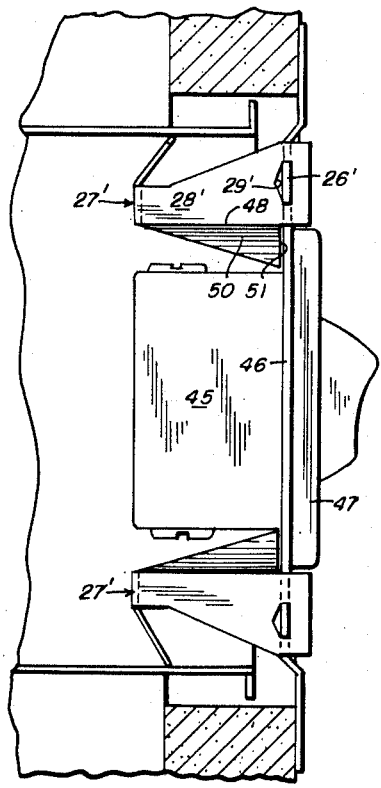
FIGURE 3 is a view similar to FIGURE 2, but showing a wall switch equipped with the devices of the present invention.
Figure 4:
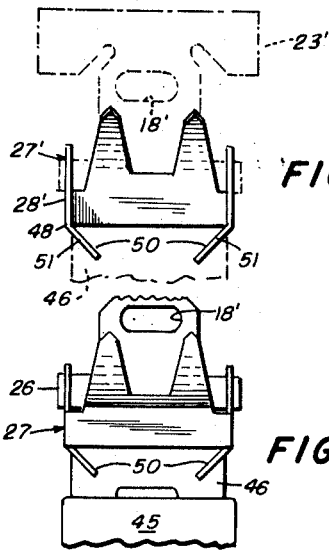
FIGURE 4 is a top plan view of one of the mounting fittings of FIGURE 3 shown applied to the switch supporting strap, the latter shown in dotted lines.
Figure 5:
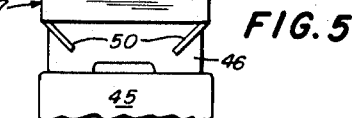
FIGURE 5 is a bottom plan view thereof.

Since all wiring devices are not so long as duplex outlets, resort in some cases must be made to another means for reinforcing the stirrup and insuring close and continuous engagement of the tongues 33 with the end walls of the box. In the conventional Despard Line devices a switch, such as shown in FIGURE 3 at 45, is too short to offer abutments for the stirrups and, moreover, is usually provided with screw terminals on the end walls which must be kept away from metal parts. In these devices, however, the flat mounting strap 46 is wide and has straight side edges which are strongly reinforced by the upturned rails 47, one on either side, which extend for a length greater than that of the wiring device which, as shown, is a rocker type switch. Such a mounting strap is provided with tabs 26', as in the first embodiment, which take into openings 29' in the stirrup side walls 28', as in the previous embodiment, and the tongues on the cross member 27' are identical, but since switches do not need grounding the tang 34, 35 of FIGURES 1 and 2 may be omitted, as seen in FIGURES 3 to 5, inclusive. However, since there can be no abutting against the insulation of the switch housing the inner edge 48 of the stirrup which is straight, except for the slight tongue 41 in the first embodiment, is fitted with a long narrow triangular gusset or wing 50, integrated therewith and having a straight edge 51, facing forwardly, which engages under the surface of strap 46, the gusset being bent at an angle in respect to the portion 28' of the stirrup as clearly seen in both FIGURES 4 and 5. This portion of the strap is well strengthened by the side rails 47 and readily takes the torque offered by the pressure of the tabs and tongues on the end walls of the box and relieves the tongues 26' from a twisting torque, thereby converting the load to substantially straight shear.

The two embodiments are thus exemplary of different means of resisting the pressures used to hold the tongues 33 into close engagement with the walls of the box.

By making the stirrup-like devices readily removable by prying them off the ends of the tongues 26 in either of the embodiments they can be used or not in accordance with the desires of the wiremen and the specific purposes of their use. Also the facility with which they can be removed contributes to the ease of replacing wiring devices where necessary, although the tongues themselves may be pried up as previously pointed out for removal of the wiring device from the box when changes are desired.

I claim:
1. Apparatus for mounting and securing a wiring device in a wall box having flat end walls comprising in combination; an insulating housing, a mounting strap secured to said housing and projecting through and beyond the ends thereof so as to span a distance greater than that between said walls, a pair of stirrup-like devices removably attached to said mounting strap, extending rearwardly and beneath the strap and spaced apart thereon less than the distance between said walls, each stirrup having two side members and a bottom member at least two long resilient tangs projecting forwardly and outward from the bottom member towards the adjacent strap end and sharply pointed, said points on the spaced stirrups being so spaced as to each engage and grip one box end wall to resist device withdrawal after being pressed into the box.

2. A wiring device for automatic mounting when pressed into a wall box having flat, parallel, end walls comprising in combination; an insulating housing having contacts therein, a metal mounting strap secured to said housing near its forward end and extending through and beyond its ends, said strap being longer than the distance between said box walls so that its ends may rest on a room wall surface beyond the box ends, a stirrup means, having side members, detachably secured near each end of said strap adjacent one end of the insulating housing and having a bottom member extending below the under surface of the strap to substantially the depth of said housing, barbs so spaced and projecting from each stirrup as to engage the said box walls when the device is inserted in the box until the strap ends engage the surface of the room wall in which the box is mounted, and projections on the device housing one facing each adjacent end wall of the box and engaged by the corresponding stirrup to maintain the pressure of its barbs on the adjacent end wall.

3. A wiring device for automatic mounting when pressed into a wall box having flat, parallel, end walls comprising in combination; an insulating housing having contacts therein, a metal mounting strap secured to said housing near its forward end and extending through and beyond its ends, said strap being longer than the distance between said box walls so that its ends may rest on a room wall surface beyond the box ends, a stirrup means, having side members, detachably secured near each end of said strap adjacent one end of the insulating housing and having a bottom member extending below the under surface of the strap to substantially the depth of said housing barbs so spaced and projecting from each stirrup as to engage the said box walls when the device is inserted in the box until the strap ends engage the surface of the room wall in which the box is mounted, each stirrup side member having a wing extending from the inward facing edge thereof, each wing having a surface engaging beneath said strap remote from the attachment point of its side member to brace the stirrup and hold its barbs in box wall engagement.

4. A wiring device for use flush mounted in a wall box comprising in combination; a housing of insulating material containing contact and terminal elements and having a portion adapted to extend through a wall plate, a metal mounting strap for and secured to said housing and having longitudinal sections, portions of which extend beyond the ends of said housing in a plane near the front face of the housing, a pair of U-shaped stirrups each having two side members and an integral connecting bottom member, means securing the outer ends of the side members of each stirrup to a different one of said longitudinal sections of said mounting strap so that their connecting bottom member is displaced beneath the strap, and a pair of laterally spaced, sharpened prongs integral with and projecting from the bottom member of the stirrup toward the adjacent ends of the strap for engaging the end walls of the said box for positioning and securing the wiring device therein.

5. The wiring device of claim 4 in which the said housing is longer than the spacing of the two stirrups which therefore straddle it, and abutments integral with said housing and engaged by the inwardly facing edges of the stirrup side members remote from their attachments to the mounting strap to maintain the prongs in position.

6. The wiring device of claim 4 in which the housing is shorter than the spacing of the two stirrups, bracing means on each side member of each stirrup extending toward the housing and having a surface engaging beneath the strap to maintain said prongs in tight engagement with the box end walls.

7. The wiring device of claim 4 in which each stirrup is provided with a resilient arm having a non-sharpened tab end positioned to engage the adjacent box wall without marring its surface for grounding the strap to the box.

8. The wiring device of claim 4 in which each longitudinal section of the mounting strap has two integral tabs extending oppositely one from each edge thereof, and each stirrup side member having a slot near its outer end closely receiving one of said integral tabs for removably attaching the stirrup to the mounting strap.

References Cited by the Examiner

UNITED STATES PATENTS

| 1,999,194 | 4/35 | Hubbell. |
| 2,934,590 | 4/60 | Thompson et al. _____ 174—53 |

FOREIGN PATENTS

| 274,606 | 7/27 | Great Britain. |
| 705,800 | 3/54 | Great Britain. |

JOHN F. BURNS, *Primary Examiner.*
JOHN P. WILDMAN, E. JAMES SAX, *Examiners.*